(12) United States Patent
Shirakata et al.

(10) Patent No.: US 6,169,751 B1
(45) Date of Patent: Jan. 2, 2001

(54) OFDM RECEIVING APPARATUS

(75) Inventors: Naganori Shirakata, Ibaraki; Yasuo Harada, Kobe; Hiroshi Hayashino, Himeji, all of (JP)

(73) Assignee: Matsushita Electric Industrial Co., Ltd., Osaka-Fu (JP)

( * ) Notice: Under 35 U.S.C. 154(b), the term of this patent shall be extended for 0 days.

(21) Appl. No.: 09/036,784

(22) Filed: Mar. 9, 1998

(30) Foreign Application Priority Data

Mar. 10, 1997 (JP) .................................................. 9-054560

(51) Int. Cl.[7] .................................................. H04J 1/00
(52) U.S. Cl. ........................................... 370/480; 370/503
(58) Field of Search .................................. 370/480, 441, 370/442, 503, 350, 208, 210, 343, 203, 206, 491, 482, 204, 484, 507, 518, 504, 509, 510, 512; 375/354, 356, 359, 362, 375, 298, 300, 327, 348, 355, 363, 364, 373, 376

(56) References Cited

U.S. PATENT DOCUMENTS 5,764,706 * 6/1998 Carlin et al. ........................ 370/203
5,914,933 * 6/1999 Cimini et al. ........................ 370/208
5,956,318 * 9/1999 Saeki ..................................... 370/206

FOREIGN PATENT DOCUMENTS

| 7-99486 | 4/1995 | (JP) . |
| 8-102769 | 4/1996 | (JP) . |
| 8-125630 | 5/1996 | (JP) . |
| 8-265291 | 10/1996 | (JP) . |

* cited by examiner

Primary Examiner—Dang Ton
(74) Attorney, Agent, or Firm—Wenderoth, Lind & Ponack, L.L.P.

(57) ABSTRACT

An OFDM receiving apparatus converts a received OFDM signal based on two sampling timing signals to detect reference symbols intermittently inserted in the OFDM signal. Based on the detected reference symbols, a frame synchronization is established. Further, clock components in the reference symbols are extracted, and compared with the sampling timing signals only in the reference symbol duration to obtain a phase error. Based on the phase error, the sampling timing signal is controlled to establish a bit-synchronization. For this purpose, at least two samplers, delayer, and phase error holder are provided.

20 Claims, 6 Drawing Sheets

OFDM RECEIVING APPARATUS

BACKGROUND OF THE INVENTION

1. Field of the Invention

The present invention relates to an OFDM (Orthogonal Frequency Division Multiplex) receiving apparatus, and particularly to a frame synchronizing circuit and a bit synchronizing circuit.

2. Description of the Background Art

In recent years, communication using OFDM (Orthogonal Frequency Division Multiplex) signal is attracting attention in the fields of digital sound broadcasting for the movable terminals and the terrestrial digital television broadcasting, etc. This is because the OFDM signal is capable of high-speed transmission of a large amount of data because of its superior frequency efficiency, is less prone to characteristic deterioration due to a reflected wave even in the absence of a waveform equalizer, and is also less prone to interfere with other services because of its signal waveform is close to random noise.

FIG. 7 is a diagram showing a configuration of an OFDM signal. An arrow GA indicates symbols of the OFDM signal S along the time base, and an arrow GB indicates the part a of the symbols indicated by the arrow GA in an enlarged manner. The OFDM signal S is formed of symbols Sm (m=1, 2, ...) arranged along the time base. Each symbol Sm is formed by digital-modulating (e.g., QPSK, 16 QAM, etc.) a plurality (several tens to several thousands, e.g., 512) of carriers differing in frequency (orthogonal to each other in the symbol time ts) with data to be transmitted and multiplexing the modulated carriers on the frequency base by an inverse FFT (Fast Fourier Transform) calculation. The symbols Sm therefore all exhibit random amplitude distribution as shown by the arrow GB. On the transmission path, this OFDM signal S takes the form of a complex signal with overlapping real and imaginary parts for each symbol Sm.

Such OFDM signal is transmitted from a transmitting party to a receiving party through wired or radio transmission path. On wired transmission path, the occupied frequency band is regulated by transmission characteristics of the transmission path. On radio transmission path, the occupied frequency band is regulated by law. Hence the transmitting party converts the OFDM signal from the intermediate frequency band to the occupied frequency band of the transmission path. When demodulating the data, the receiving party converts the received OFDM signal from the occupied frequency band of the transmission path to the intermediate frequency band for the demodulating process.

The received OFDM signal can be OFDM-demodulated with the aid of an FFT calculation. Accordingly, it is necessary for the OFDM receiving apparatus to regenerate the symbol timing of the OFDM symbols for the process of FFT calculation. For this purpose, generally, reference symbols for timing synchronization are periodically transmitted in OFDM transmission.

FIG. 8 shows a frame configuration of the OFDM signal S. A duration with no signal, called "a null symbol NS," is provided at the head of a frame DFr, by detecting which frame synchronization is obtained. The null symbol NS is also used to detect rough synchronization of symbol timing. The null symbol NS is followed by a reference symbol RS for timing synchronization (hereinafter referred to as a synchronizing symbol), with which precise symbol timing is detected. The synchronizing symbol RS is followed by information symbols DS.

Conventional OFDM receiving apparatuses that detect synchronization by using such a frame configuration include one disclosed in a laid open Japanese Patent Publication No.8-265291. According to this example, two synchronization detecting symbols are required the null symbol NS and the synchronizing symbol RS. This reduces the amount of information symbols DS that can be transmitted, resulting in lowering of the transmission efficiency.

Furthermore, since the synchronizing symbol cannot be detected without establishing frame synchronization by detecting the null symbol NS, a doubled time is required to establish the synchronization.

In detecting the synchronizing symbol, it is necessary that the sample timing signal for analog-to-digital conversion has its frequency aligned with the clock frequency of data so that the data can be sampled at identify points and its phase precisely synchronized with that of the data. In the absence of the bit synchronization, the phase of the sample timing varies with respect to the received signal moment by moment. Then the original data may be converted into wrong data. If the digital data obtained by converting the received signal has errors, the synchronizing symbol may not be detected, or may be wrongly detected. Then the symbol timing cannot be obtained correctly.

Establishing the bit synchronization requires extracting the clock component of the received signal to obtain frequency alignment with the data clock by using a PLL (Phase-Locked Loop) circuit, etc., and obtaining phase alignment in the data sample timing.

However, it is difficult to extract the clock component from the received OFDM signal since its signal waveform is close to that of random noise. Accordingly, a clock must be regenerated by using only the synchronizing symbol to establish the bit synchronization.

SUMMARY OF THE INVENTION

The present invention has been made to solve the above-described conventional problems. A first aspect of the present invention is an OFDM receiving apparatus receiving an OFDM signal. The receiving apparatus comprises plural data symbols and plural reference symbols inserted in each of the data symbols at a predetermined interval based on a clock signal. The said apparatus comprises:

a timing generator for generating a first timing signal on the basis of a control signal;

a first synchronizing symbol detector for detecting the reference symbol in the OFDM signal based on the first timing signal to produce a first synchronizing symbol detection signal;

a second synchronizing symbol detector for detecting the reference symbol in the OFDM signal based on a second timing signal being delayed from the first timing signal by a predetermined time to produce a second synchronizing symbol detection signal; and a decider for selecting which of the first and second synchronizing symbol detection signals are synchronized with the OFDM signal.

As apparent from the above, according to a first aspect of the present invention, it is possible to establish the frame synchronizing and the bit synchronization between the transmitted OFDM signal and received OFDM signal based on the reference symbols having predetermined patterned waveform but on the data symbols having random patterned waveforms.

According to a second aspect, in the first aspect of the present invention, an OFDM receiving apparatus, further comprises:

a synchronization detector for establishing frame synchronization based on the selected synchronizing symbol detection signals;

a phase comparator for comparing phases of the clock signal and the first timing signal to produce a phase error signal;

a hold unit for holding the phase error signal based on the selected synchronizing symbol detection signals to produce a hold signal; and a loop filter for smoothing the output signal from the hold unit to output the control signal.

According to a third aspect, in the first aspect of the present invention, the first synchronizing symbol detecting unit comprises:

a first sampling unit for sampling the OFDM signal based on the first timing signal to produce a first digitalized signal; and a first synchronizing symbol detecting unit for detecting the reference symbol to produce the first synchronizing symbol detection signal based on the first digitalized signal; and the second synchronizing symbol detector comprises a delayer for delaying the first timing signal by a predetermined time to produce a second timing signal;

a second sampler for sampling the OFDM signal based on the second timing signal to produce a digitalized signal; and a second synchronizing symbol detector for detecting the reference symbol to produce the second synchronizing symbol detection signal based on the second digitalized signal.

According to a fourth aspect, in the first aspect of the present invention, the reference symbol is a symbol obtained by ASK-modulating a particular pseudo-random sequence.

According to a fifth aspect, in the first aspect of the present invention, the reference symbol is a symbol obtained by PSK-modulating a particular pseudo-random sequence.

According to a sixth aspect, in the first aspect of the present invention, at least one of the first and second sampler is comprised of an analog-to-digital converting circuit.

According to a seventh aspect, in the first aspect of the present invention, at least one of the first and second samplers is comprised of a latch circuit.

According to a eighth aspect, in the first aspect of the present invention, at least one of the delayers is comprised of an inverting circuit for inverting the polarity of the first timing signal.

According to a ninth aspect, in the first aspect of the present invention, the said second synchronizing symbol detector detects the reference symbol in the OFDM signal based on a predetermined number of timing signals each being delayed from the first timing signal by a different predetermined time to produce the predetermined number of synchronizing symbol detection signals.

According to a tenth aspect, in the first aspect of the present invention, the predetermined time is in a range greater than zero and not greater than one cycle of the clock signal.

As apparent from the above, according to the tenth aspect, since a plurality of delayers are provided for delaying the timing signal within one cycle, it is possible to determine the correct synchronizing symbol promptly.

These and other objects, features, aspects and advantages of the present invention will become more apparent from the following detailed description of the present invention when taken in conjunction with the accompanying drawings.

DESCRIPTION OF THE PREFERRED EMBODIMENT

With reference to FIGS. 1, 2, 3, 4, 5, and 6, an OFDM receiving apparatus according to an embodiment of the present invention is be described herebelow.

Figure 3:
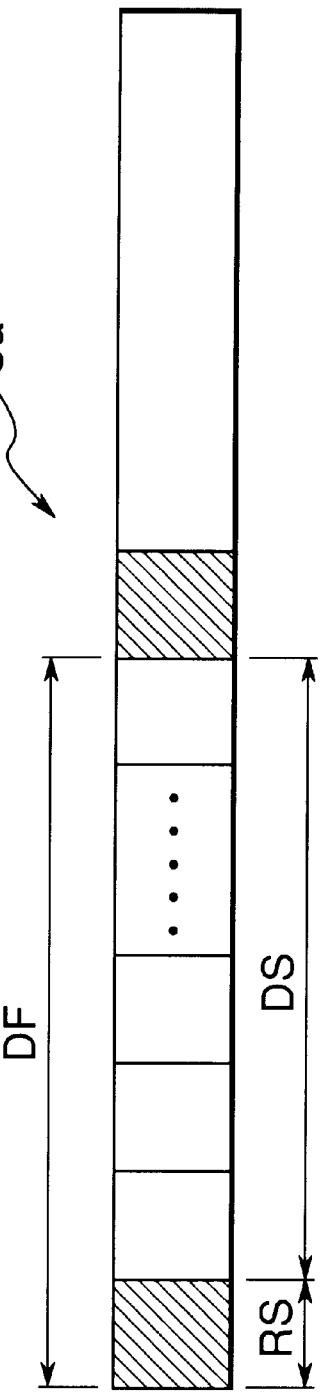
FIG. 3 is a graph in assistance of explaining a frame configuration of the OFDM signal processed by the OFDM receiving apparatus of FIG. 1.

Referring to FIG. 3, a frame structure of the OFDM signal Sa to be received and processed by the OFDM receiving apparatus according to the present invention is shown. A synchronizing symbol, or reference symbol, RS for frame synchronization is added at the head of each data frame DF. For the synchronizing symbol RS, a signal from which the clock component can be relatively easily extracted can be selected. For example, signals obtained by ASK-modulating or PSK-modulating a particular PN sequence may be used.

Figure 1:
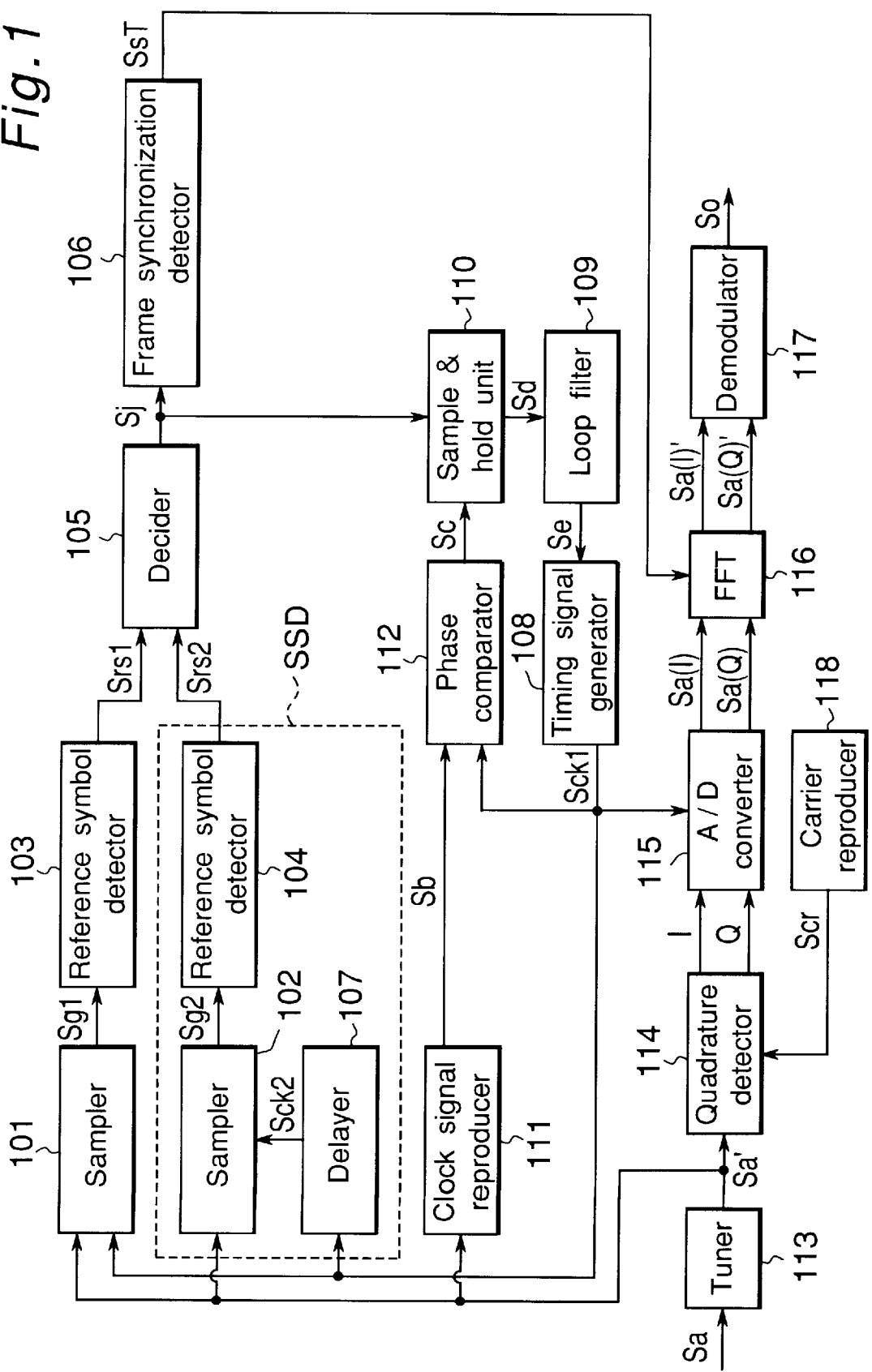
FIG. 1 is a block diagram showing the structure of an OFDM receiving apparatus according to an embodiment of the present invention.

As best shown in FIG. 1, an OFDM receiving apparatus includes a first sampler 101, a second sampler 102, a first synchronizing symbol detector 103, a second synchronizing symbol detector 104, a decider 105, a frame synchronization detector 106, a delayer 107, a timing signal generator 108, a loop filter 109, a sample-and-hold unit 110, a clock signal reproducer 111, a phase comparator 112, a tuner 113, a quadrature detector circuit 114, an A/D (analog-to-digital) convertor 115, a FFT (fast Fourier transformer) 116, a data demodulator 117, and a carrier reproducer 118.

The tuner 113 is connected to a receiving unit (not shown in FIG. 1) externally provided for receiving an OFDM signal Sa transmitted by an OFDM transmitting apparatus (not shown in FIG. 1). The tuner 113 converts the received OFDM signal Sa, hereinafter referred to as "OFDM signal" for the sake of brevity, having an occupied frequency band in a transmission path into an OFDM signal Sa' having an intermediate frequency range. The data frame structure is still preserved after conversion.

The quadrature detector 114 is connected to the tuner 113 for receiving the OFDM signal Sa' in an intermediate frequency range. The quadrature detector 114 converts the OFDM signal Sa' into a base-band OFDM signal, and a real part I and an imaginary part Q are taken out.

The A/D converter 115 is connected to the quadrature detector 114 for receiving the both the real part I and imaginary part Q of the base-band OFDM signal therefrom. The A/D convertor 115 converts the both parts I and Q into digital forms Sa(I) and Sa(Q), respectively.

The FFT 116 is connected to the A/D converter 115 for receiving the digitalized parts Sa(I) and Sa(Q) of the base-band OFDM signal therefrom to perform the fast Fourier transformation on every symbol thereof. Thus, the OFDM signal is divided into a real part Sa(I)' and an imaginary part Sa(Q)' on a frequency axis of the digital modulated wave.

The demodulator 117 is connected to the FFT 116 for receiving and demodulating both parts, Sa(I)' and Sa(Q)', of the digital modulated wave. Thus, the original data SO is reproduced. The reproduced original data SO is output to further processing devices (not shown) externally provided in a receiving station.

The first sampler 101 is connected to the tuner 113 and the timing signal generator 108 for receiving the OFDM signal Sa' and a first timing signal Sck1 therefrom, respectively. The sampler 101 samples the signal Sa' in an intermediate frequency range at leading edges of the first timing signal Sck1 to convert the signal Sa' into a first digital data Sg1.

The reference symbol detector 103 is connected to the sampler 101 for receiving the digital data Sg1 therefrom. The wave data of reference symbol RS of the OFDM signal Sa is previously stored in the reference symbol detector 103. The first reference symbol detector 103 compares the first digital data Sg1 with the previously stored reference symbol RS to detect a time or duration when the stored reference symbol RS overlaps the first digital data Sg1. When it is determined that the data Sg1 coincides with stored reference symbols RS with respect to the waveforms thereof, the detector 103 produces a first synchronizing symbol detection signal Srs1.

The second sampler 102 and the second reference symbol detector 104 are provided in manners similar to those of the first sampler 101 and detector 103, respectively. The second sampler 102 and detector 104 are constructed with substantially the same structures as those of the first sampler 101 and detector 103, respectively. Similarly, the second sampler 102 is connected to the tuner 113 for receiving the OFDM signal therefrom, but is also connected to the timing signal generator 108 through the delayer 107. The delayer 107 delays the first timing signal by a predetermined time Dt less than one cycle, such as half a cycle for example, to produce a second timing signal Sck2. The second sampler 102 samples the signal Sa' by timing at leading edges of the second timing signal Sck2 to convert the signal Sa' into a second digital data Sg2. The second reference symbol detector 104 compares the second digital data Sg2 and the synchronizing symbol RS previously stored in the second reference symbol detector 104 to detect the overlapping thereof, and then produces a second synchronizing symbol detection signal Srs2, similarly.

Thus, the sampler 102, detector 104, and delayer 107 construct a synchronization symbol detector SSD which tries to detect reference symbols for the synchronization at a timing delayed from the timing of the first timing signal Sck1. The reference symbol detectors 103 and 104 can be realized by using a correlator and a comparator, for example. In this case, the reference symbol detector 103 (104) obtains correlation values between the reference symbol RS and the digital data Sg1 (Sg2) in the correlator, and then compares the values with a certain threshold. When the threshold is exceeded, it recognizes that the reference symbol RS has been detected, and outputs the synchronizing symbol detection signal Srs1 (Srs2).

The decider 105 is connected to both the first and second reference symbol detectors 103 and 104 for receiving the first and second synchronizing symbol detection signal Srs1 and Srs2, respectively, therefrom. The decider 105 decides whether the synchronization symbols RS are detected or not, and outputs the synchronizing symbol detection signal.

The decider 105 determines which detection signal Srs1 or Srs2 is correctly detecting the synchronizing symbol RS when both signals Srs1 and Srs2 are supplied thereto at the same time.

Specifically, the first timing signal Sck1 generated from the timing signal generator 108 is not bit-synchronized with the received signal Sa' (Sa), the phase of the sample timing (Sck) varies relative to the received signal (Sa') every moment. When the data Sa' is sampled at identify points, the received signal Sa' can be correctly bit-converted. However, if the sample timing (Sa') varies and the data (Sa') is sampled at changing points, it will be converted into wrong bits. In this case, the converted digital data Sg includes errors, from which the synchronizing symbol RS cannot be detected or may be erroneously detected. However, even if the first timing signal Sck1 samples the received signal Sa' at changing points of data, the second timing signal Sck2 delayed by a half cycle samples the data Sa' at identify points, so that the received signal Sa' can be correctly converted into digital data Sg2.

Figure 4:
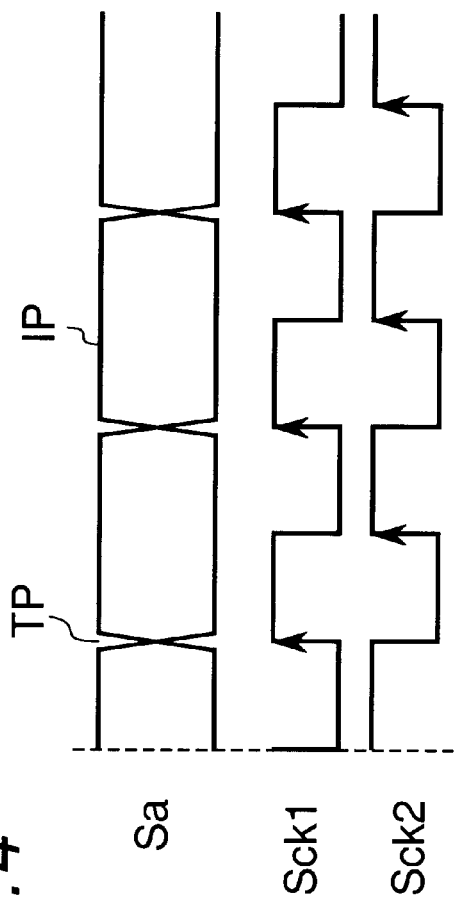
FIG. 4 is a graph in assistance of explaining a relationship between the received OFDM signal and sampling timings according to the present invention.

With reference to FIG. 4, the above described condition is described. It is assumed here that the received signal Sa is sampled at leading edges of the timing signals Sck1 and Sck2. In this case, the reference symbol RS can be correctly detected from the digital data Sa' sampled with the second timing signal Sck2. That is to say, at least one of the first and second timing signals Sck1 and Sck2 can sample the received signal Sa at identify points IP and convert it into correct digital data Sg1 or Sg2.

Referring back to FIG. 1, hence, the decider 105 determines that the reference symbol RS has been detected when at least one of the first and second reference symbol detection signals Srs1 and Srs2 is inputted. The decider 105 outputs a synchronizing detection signal Sj in synchronization with timing of the signal Sck1 or Sck2 whichever the synchronizing symbol could be detected.

The frame synchronization detector 106 is connected to the decider 105 for receiving the synchronizing detection signal Sj therefrom to establish frame synchronization. Based on thus established frame synchronization, the detector 106 produces a symbol timing signal SsT which will be transferred to the FFT 116.

The samplers 101 and 102 can be realized with an analog-to-digital converting circuit or a latch circuit, for example.

When the second timing signal Sck2 is delayed by half a cycle with respect to the first timing signal Sck1, the delayer 107 can be realized by using an inverting circuit for inverting the polarity.

The clock signal reproducer 111 is connected to the tuner 113 for receiving the received OFDM signal Sa' therefrom. The clock signal reproducer 111 extracts the clock component from the received signal Sa' to reproduce a clock signal Sb on which the OFDM signal Sa is modulated by the OFDM modulating apparatus (not shown). The clock signal reproducer 111 can be realized with a differentiating circuit for extracting edge component of the received signal Sa' (Sa) and a waveform shaping circuit, for example.

The phase comparator 112 is connected to the clock signal reproducer 111 and the timing signal generator 108 for receiving the reproduced clock signal Sb and the first timing signal Sck1, respectively, therefrom. The phase comparator 112 compares the reproduced clock signal Sb and the first timing signal Sck1 in phase to output the error as a phase error signal Sc.

The sample-and-hold unit 110 is connected to the decider 105 and phase comparator 112 for receiving the synchronization symbol detection signal Sj and the phase error signal Sc, respectively, therefrom. The sample-and-hold unit 110 samples and holds the phase error signal Sc based on the synchronizing symbol detect decision signal Sj. In a duration of the synchronizing symbol RS, it outputs the phase error signal Sc as it is therefrom as a sample-hold signal Sd to be fed back to the timing signal generator 108 through the loop filter 109.

At an instant of change to a duration of a symbol other than the synchronizing symbol, the sample-and-hold unit 110 samples the last value of the phase error signal Sc, and holds the sampled value until the next synchronizing symbol duration.

Figure 5:
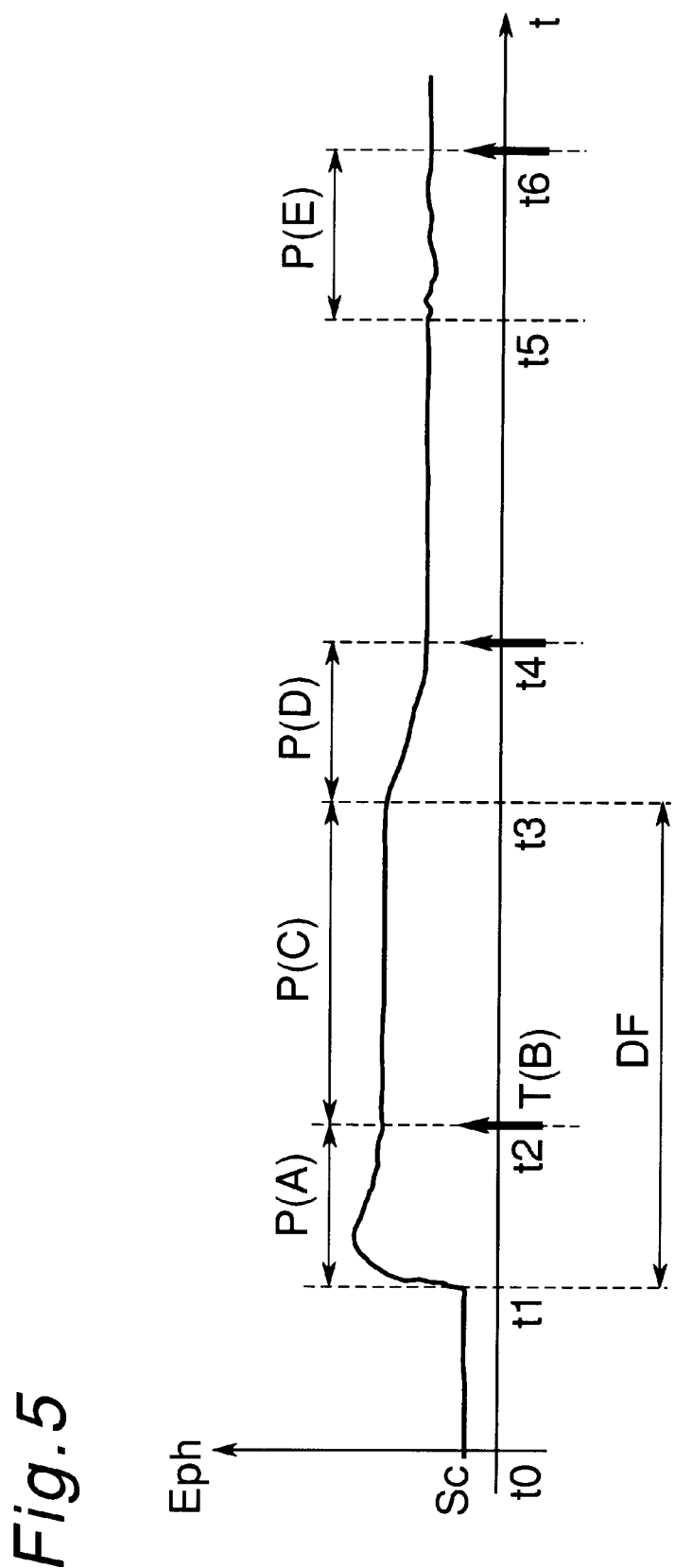
FIG. 5 is a graph in assistance of explaining the operation of the sample-and-hold unit in the OFDM receiving apparatus of FIG. 1.

With reference to FIG. 5 wherein the phase error Eph in the vertical axis is shown with respect to time in horizontal axis, the situation will be described. The sample-and-hold unit 110 intactly outputs the phase error signal Sc which is inputted in the duration P(A), from time t1 to t2, of the synchronizing symbol RS. This is to compare the phase of the reproduced clock signal Sb obtained from the synchronizing symbol RS and the phase of the sampling timing signal Sck1, and to feed the comparing result back SC to the timing signal generator 108 through the loop filter 109 to operate the PLL. Note that the timing signal generator 108, loop filter 109, sample-and-hold unit 110, clock signal generator 111, and phase comparator 112 construct the PLL.

The unit 110 samples the value Eph of the phase error signal Sc at the end timing T(B) of the synchronizing symbol RS, duration P(A), and holds the value for the data symbol duration P(C), time t2 to t3, until the next synchronizing symbol RS is detected. Thus, it prevents the phase error of the reproduced signal Sa' other than the synchronizing symbol RS against that the reproduced clock signal Sb from being fed back. As a result, a wrong phase error will not be fed back even if it is difficult to extract the clock component from the received signal Sa (Sa') other than the synchronizing symbol RS.

In the next synchronizing symbol duration P(D), from time t3 to t4, the unit 110 intactly outputs the phase error signal Sc as the sample-hold signal Sd to the timing signal generator 108 through the loop filter 109. Then the PLL (108, 109, 110, 111, and 112) operates, as does in the synchronization symbol duration P(A). It is then possible to bring the phase error Eph which was corrected to some extent in the previous synchronizing (reference) symbol duration P(A) closer to the locked range in the following synchronizing (reference) symbol duration (D). By repeating this operation, the phase error Eph can be drawn into the locked range, even if the phase could not be drawn into the locked range in a certain synchronizing symbol duration such as P(A), P(D) and P(E) in FIG. 5. Thus, the synchronization can be stably established.

The output signal Sd from the sample-and-hold unit 110 is fed back through the loop filter 109 for smoothing to the timing signal generator 108 as a control signal Se for the timing signal generator 108 which is one of the members constructing the PLL. Then the timing signal Sck1, which is synchronized in phase with the received OFDM signal Sa (Sa'), can be obtained, resulting in the establishment of the bit synchronization. The timing signal generator 108 can be realized with a VCO circuit and a divider circuit, for example.

Figure 6:
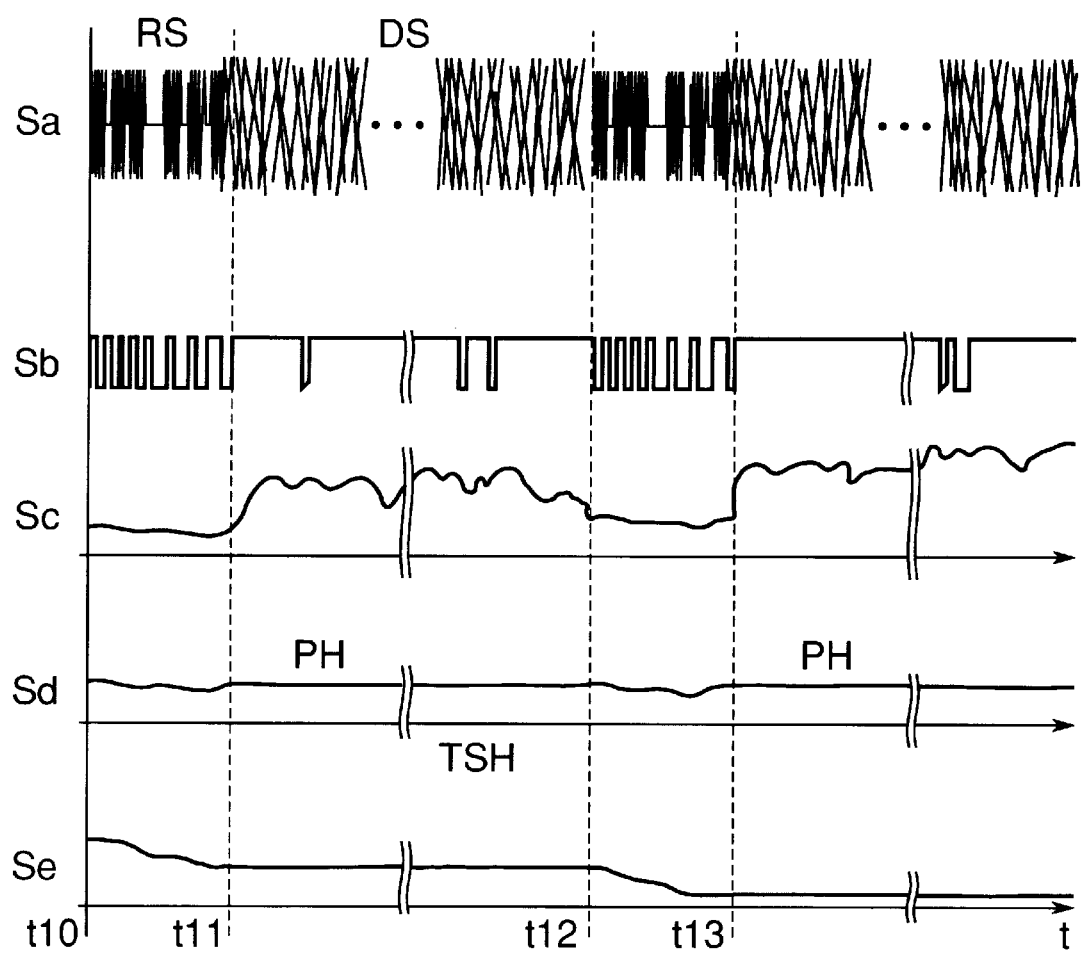
FIG. 6 is a graph showing various signals observed in the OFDM receiving apparatus of FIG. 1.
Figure 7:
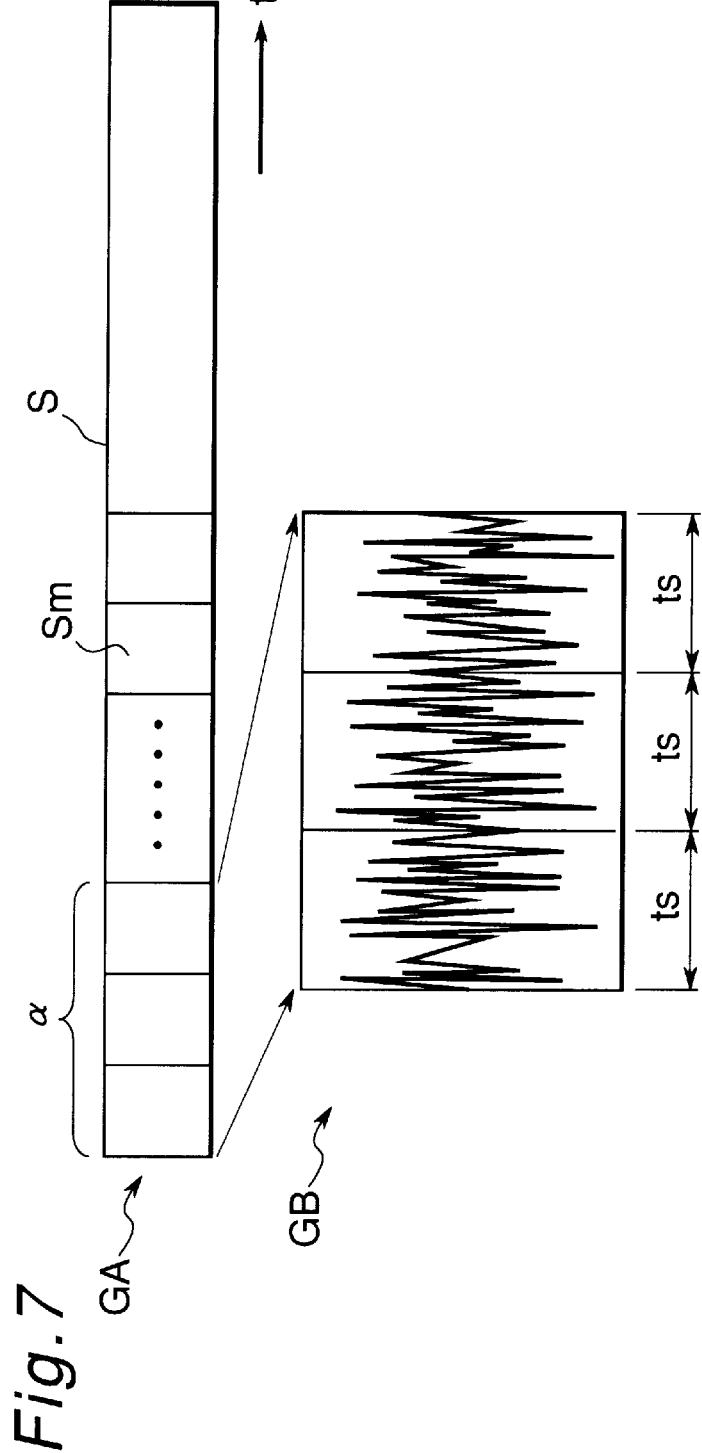
FIG. 7 is a diagram showing a configuration of an OFDM signal.
Figure 8:
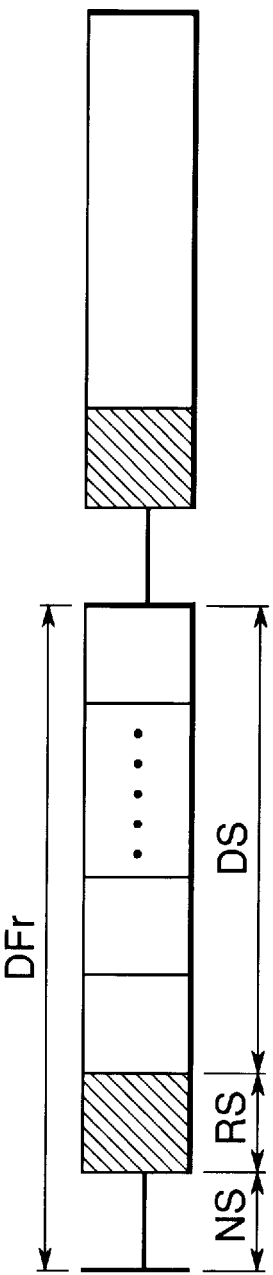
FIG. 8 is a diagram showing a frame configuration of an OFDM signal used in a conventional OFDM transmission system.

Referring to FIG. 6, waveforms of the received OFDM signal Sa, reproduced clock signal Sb, phase error signal Sc, sample-hold signal Sd, and control signal Se for the timing signal generation are shown as synchronized on the time base. The periods from time t10 to t11, from time t11 to t12, and from t12 to t13 respectively correspond to the synchronizing symbol period P(A), data symbol period P(C), and synchronizing symbol period P(D).

As typically shown in FIG. 6, the reference symbol RS is inserted into the OFDM signal Sa is inserted the reference The reference symbol RS has a wave form from which it is easy to extract a frequency component thereof, because the data symbols DS itself have wave forms that are hard to distinguish from noises. From the received OFDM signal Sa, clock components are extracted distinguishably, as shown. As a result of comparison of the reproduced clock signal Sb with the generated timing signal Sck1, the phase error signal Sc showing a typical patterned wave form in the synchronizing durations t10–t11 and t12–t13, and random patterned wave forms elsewhere is obtained.

The sample-and-hold signal Sd has the same wave forms as those of the phase error signal Sb in the synchronizing durations t10–t11 and t12–t13, and wave forms held at the final (at time t11, and time t13) value PH of synchronizing symbol for the data symbol durations. Thus, the random patterned phase error value Eph in the data symbol duration is not fed back to the PLL.

The control signal Se is used for the phase comparison only in the synchronizing durations to make the timing signal Sck1 follow the clock components extracted from the received OFDM signal Sa. Since the phase comparison is not effective in the data symbol durations, the phase error is reserved.

Figure 2:
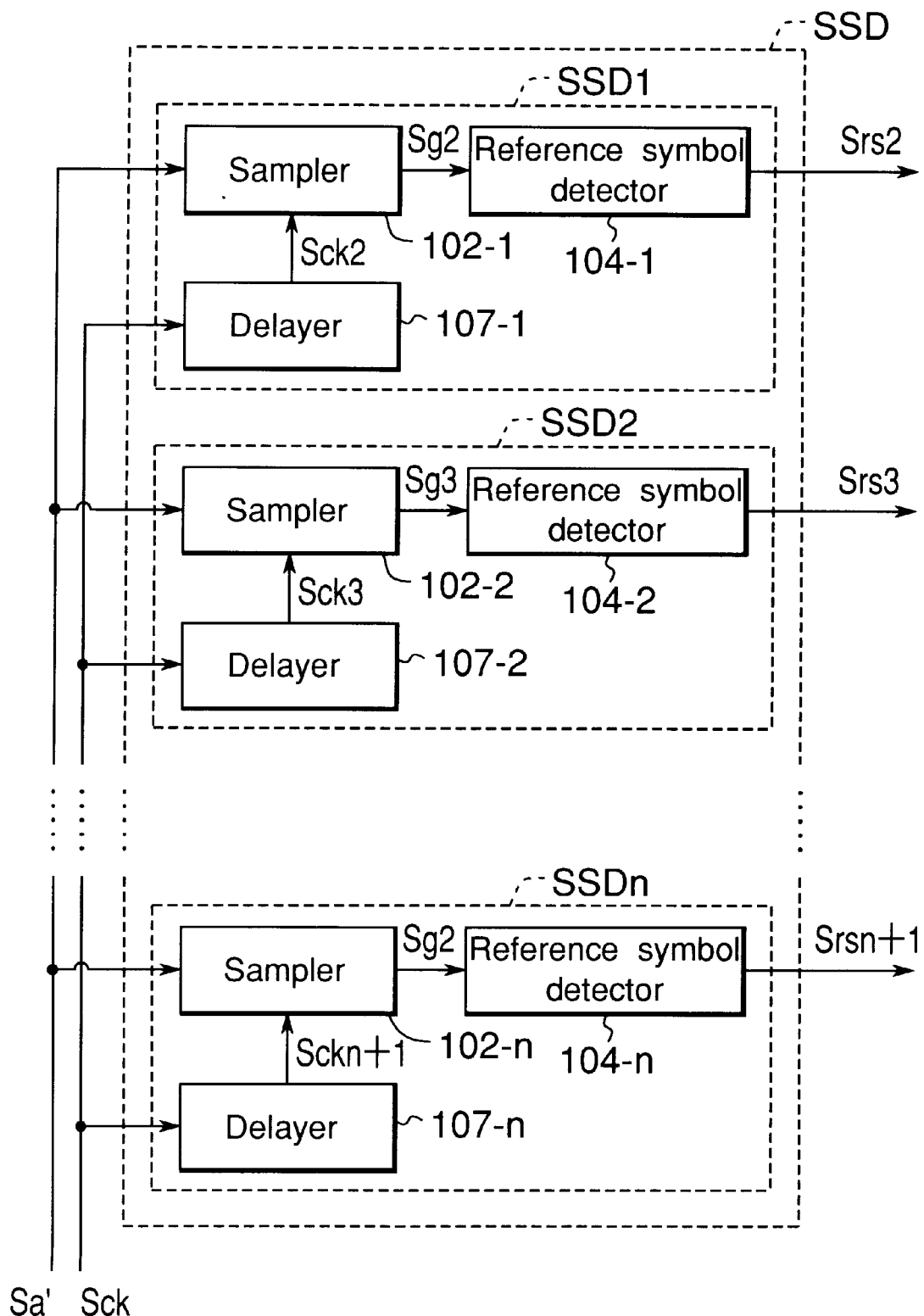
FIG. 2 is a block diagram showing an alternative of the delayed reference symbol detector used in the OFDM receiving apparatus of FIG. 1.

Referring to FIG. 2, an alternative of synchronization symbol detector SSD shown in FIG. 1 is described. Although in FIG. 1 only a single synchronization symbol detector SSD is provided, a predetermined number n (n is an integer) of synchronizing symbol detector SSD1 to SSDn are provided in parallel in the alternative shown in FIG. 2. Each of plural synchronizing symbol detector SSD1 to SSDn is constructed by substantially the same members as those in the detector SSD of FIG. 1, as typically shown in FIG. 2. Each of delayers 107-1 to 107-n is connected to the timing signal generator 108 to delay the first timing signal Sck1 by different delay time Dt to produce second to n+1th timing signals Sck2 to Sckn+1.

Specifically, the delayer 107-m+1 (m is an integer greater than 1 and less than n) has a delay time greater than that of preceding delayer 107-m. However, the delay time Dt between each delayer 107-1 to 107-n is preferably 1/n cycle, but it not necessary to increase the delay time between each delayer by a constant value. As a result, 2nd to (n−1)th digital signals Sg2 to Sgn+1 are produced in the detectors SSD1 to SSDn, respectively, and the 2nd to (n−1)th reference symbol detection signal Srs2 to Srsn+1 are outputted therefrom. Since the interval of each of signal Srs2 to Srsn+1 is very short, decider 105 can determine the correct synchronizing symbol promptly.

Note that all members constructing the OFDM receiving apparatus according to the present invention can be realized by software such as programs for computer and hardware such as electric circuitry.

While the invention has been described in detail, the foregoing description is in all aspects illustrative and not restrictive. It is understood that numerous other modifications and variations can be devised without departing from the scope of the invention.

What is claimed is:

1. An OFDM receiving apparatus for use in receiving an OFDM signal comprised of plural data symbols and plural reference symbols inserted into each data symbol at a predetermined interval based on a clock signal, said apparatus comprising:

timing generating means for generating a first timing signal based on a control signal;

first synchronizing symbol detecting means for detecting a reference symbol in the OFDM signal based on the first timing signal to produce a first synchronizing symbol detection signal;

second synchronizing symbol detecting means for detecting a reference symbol in the OFDM signal based on a second timing signal, which is delayed from the first timing signal by a predetermined time, to produce a second synchronizing symbol detection signal; and decision means for selecting which of the first and second synchronizing symbol detection signals is synchronized with the OFDM signal.

2. An OFDM receiving apparatus as claimed in claim 1, further comprising:

synchronization detecting means for establishing frame synchronization based on the synchronizing symbol detection signals selected by said decision means;

phase comparison means for comparing phases of the clock signal and the first timing signal to produce a phase error signal;

hold means for holding the phase error signal based on the synchronizing symbol detection signals, selected by said decision means, to produce a hold signal; and loop filter means for smoothing an output signal from said hold means to output said control signal.

3. An OFDM receiving apparatus as claimed in claim 1, wherein said first synchronizing symbol detecting means comprises:

first sampling means for sampling the OFDM signal based on the first timing signal to produce a first digitalized signal; and first reference symbol detecting means for detecting a reference symbol to produce the first synchronizing symbol detection signal based on the first digitalized signal; and said second synchronizing symbol detecting means comprises:

delay means for delaying the first timing signal by a predetermined time to produce the second timing signal;

second sampling means for sampling the OFDM signal based on the second timing signal to produce a second digitalized signal; and second reference symbol detecting means for detecting a reference symbol to produce the second synchronizing symbol detection signal based on the second digitalized signal.

4. An OFDM receiving apparatus as claimed in claim 1, wherein at least one of the reference symbols in the OFDM signal is a symbol obtained by ASK-modulating a particular pseudo-random sequence.

5. An OFDM receiving apparatus as claimed in claim 1, wherein at least one of the reference symbols in the OFDM signal is a symbol obtained by PSK-modulating a particular pseudo-random sequence.

6. An OFDM receiving apparatus as claimed in claim 3, wherein at least one of said first and second sampling means is comprised of an analog-to-digital converting circuit.

7. An OFDM receiving apparatus as claimed in claim 3, wherein at least one of said first and second sampling means is comprised of a latch circuit.

8. An OFDM receiving apparatus as claimed in claim 3, wherein at least one said delaying means is comprised of an inverting circuit for inverting polarity of the first timing signal.

9. An OFDM receiving apparatus as claimed in claim 1, wherein said second synchronizing symbol detecting means is operable for detecting a reference symbol in the OFDM signal based on a predetermined number of timing signals each being delayed from the first timing signal by a different predetermined time to produce a predetermined number of synchronizing symbol detection signals, respectively.

10. An OFDM receiving apparatus as claimed in claim 9, wherein the predetermined time is in a range greater than 0 and not greater than one cycle of the clock signal.

11. An OFDM receiving apparatus for use in receiving an OFDM signal comprised of plural data symbols and plural reference symbols inserted into each data symbol at a predetermined interval based on a clock signal, said apparatus comprising:

a timing signal generator operable to generate a first timing signal based on a control signal;

a first synchronizing symbol detector operable to detect a reference symbol in the OFDM signal based on the first timing signal, generated by said timing signal generator, to produce a first synchronization symbol detection signal;

a second synchronizing symbol detector operable to detect a reference symbol in the OFDM signal based on a second timing signal, which is delayed from the first timing signal by a predetermined time, to produce a second synchronizing symbol detection signal; and a decider operable to select which of the first and second synchronizing symbol detection signals is synchronized with the OFDM signal.

12. An OFDM receiving apparatus as claimed in claim 11, further comprising:

a synchronization detector operable to establish frame synchronization based on the synchronizing symbol detection signals selected by said decider.

13. An OFDM receiving apparatus as claimed in claim 11, wherein said first synchronizing symbol detector comprises:

a first sampler operable to sample the OFDM signal based on the first timing signal to produce a first digitalized signal; and a first reference symbol detector operable to detect a reference symbol to produce the first synchronizing symbol detection signal based on the first digitalized signal produced by said first sampler; and said second synchronizing symbol detecting means comprises:

a delayer operable to delay the first timing signal by a predetermined time to produce the second timing signal;

a second sampler operable to sample the OFDM signal based on the second timing signal to produce a second digitalized signal; and a second reference symbol detector operable to detect a reference symbol to produce the second synchronizing symbol detection signal based on the second digitalized signal.

14. An OFDM receiving apparatus as claimed in claim 13, wherein at least one of said first and second samplers is comprised of an analog-to-digital converting circuit.

15. An OFDM receiving apparatus as claimed in claim 13, wherein at least one of said first and second samplers is comprised of a latch circuit.

16. An OFDM receiving apparatus as claimed in claim 13, wherein said delayer is comprised of an inverting circuit operable to invert polarity of the first timing signal.

17. An OFDM receiving apparatus as claimed in claim 11, wherein at least one of the reference symbols in the OFDM signal is a symbol obtained by ASK-modulating a particular pseudo-random sequence.

18. An OFDM receiving apparatus as claimed in claim 11, wherein at least one of the reference symbols in the OFDM signal is a symbol obtained by PSK-modulating a particular pseudo-random sequence.

19. An OFDM receiving apparatus as claimed in claim 11, wherein said second synchronizing symbol detector is operable to detect a reference symbol in the OFDM signal based on a predetermined number of timing signals each being delayed from the first timing signal by a different predetermined time to produce a predetermined number of synchronizing symbol detection signals, respectively.

20. An OFDM receiving apparatus as claimed in claim 19, wherein the predetermined time is in a range greater than 0 and not greater than one cycle of the clock signal.

* * * * *